United States Patent [19]

Inoue et al.

[11] Patent Number: 4,843,834

[45] Date of Patent: Jul. 4, 1989

[54] DEVICE FOR CONTROLLING CAPACITY OF VARIABLE CAPACITY COMPRESSOR

[75] Inventors: Atsuo Inoue, Isesaki; Motoharu Sato, Honjo, both of Japan

[73] Assignee: Sanden Corporation, Gunma, Japan

[21] Appl. No.: 141,914

[22] Filed: Jan. 11, 1988

[30] Foreign Application Priority Data

Jan. 10, 1987 [JP] Japan .................................. 62-2637
Jan. 10, 1987 [JP] Japan .............................. 62-1500[U]

[51] Int. Cl.⁴ ............................................ F25B 41/00
[52] U.S. Cl. .................................... 62/209; 62/228.3; 62/226
[58] Field of Search .................... 62/228.3, 228.5, 226, 62/227, 209, 175, 231, 323.4; 417/213, 223

[56] References Cited

U.S. PATENT DOCUMENTS

| | | |
|---|---|---|
| 3,037,362 | 6/1958 | Tilney et al. . |
| 4,326,386 | 4/1982 | Tamura . |
| 4,358,936 | 11/1982 | Ito et al. . |
| 4,379,484 | 4/1983 | Lom et al. . |
| 4,471,632 | 9/1984 | Nishi et al. . |
| 4,485,634 | 12/1984 | Yasuda et al. . |
| 4,485,635 | 12/1984 | Sakano . |
| 4,499,739 | 2/1985 | Matsuoka et al. . |
| 4,510,764 | 4/1985 | Suzuki . |
| 4,539,821 | 9/1985 | Tamura . |
| 4,582,124 | 4/1986 | Yoshimi et al. . |
| 4,633,672 | 1/1987 | Persem et al. ..................... 62/228.3 |
| 4,633,674 | 1/1987 | Sato . |
| 4,646,535 | 3/1987 | Matsuoka et al. ............. 62/323.4 X |
| 4,694,228 | 9/1987 | Michaelis .......................... 62/227 X |
| 4,723,416 | 2/1988 | Suzuki ..................................... 62/226 |
| 4,753,083 | 6/1988 | Sato . |

FOREIGN PATENT DOCUMENTS

| | | |
|---|---|---|
| 0219283 | 4/1987 | European Pat. Off. . |
| 56-30549 | 3/1981 | Japan . |
| 56-97910 | 6/1981 | Japan . |
| 56-112314 | 9/1981 | Japan . |
| 2153922 | 8/1985 | United Kingdom . |

*Primary Examiner*—William E. Wayner
*Attorney, Agent, or Firm*—Banner, Birch, McKie & Beckett

[57] ABSTRACT

A control device for a compressor in an automotive air conditioning system is disclosed which includes a pressure sensor disposed on a conduit concerning an evaporator and the compressor for detecting a refrigerant pressure at an outlet side of the evaporator. A control unit compares a pressure change ratio based on the detected refrigerant pressures with a predetermined pressure change ratio and selects either one of two ranges of predetermined values in accordance with the compared results, and further compares the refrigerant pressure with the predetermined values, thereby controlling the operation of an electromagnetic clutch which is mounted on the compressor and the capacity of the compressor in accordance with the last mentioned compared results.

55 Claims, 10 Drawing Sheets

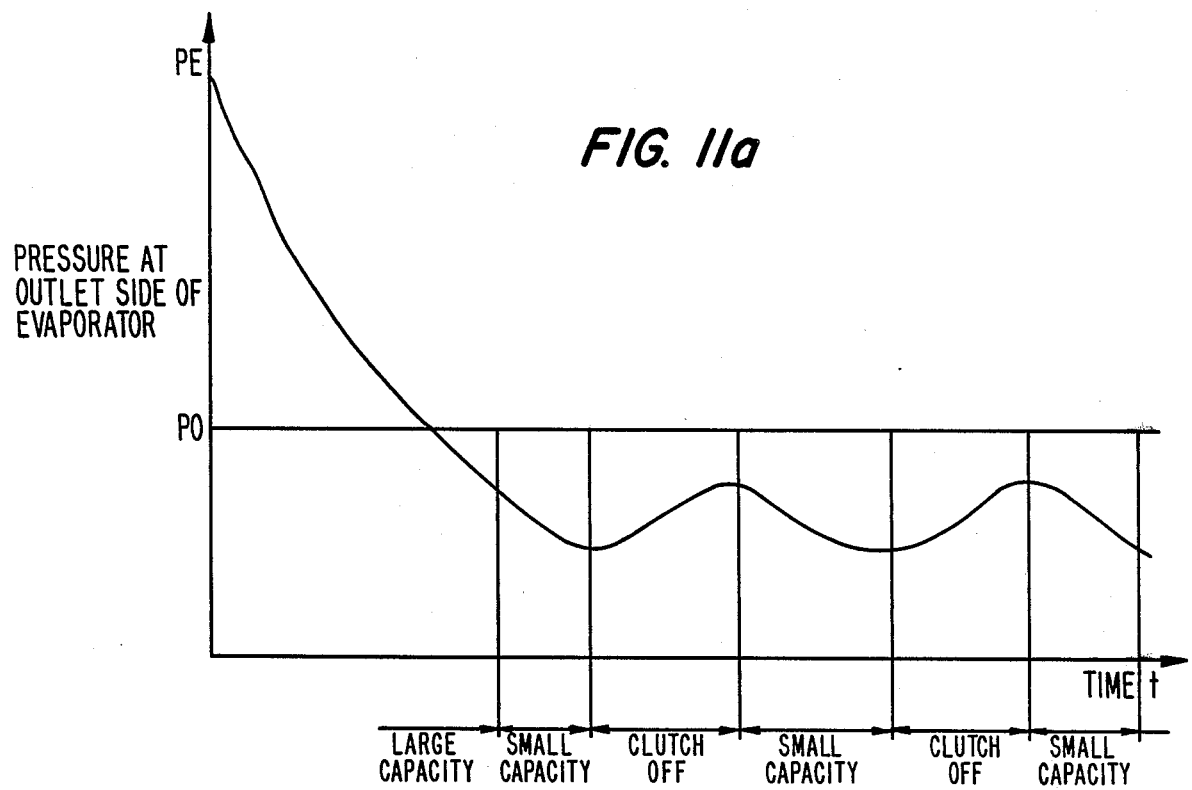
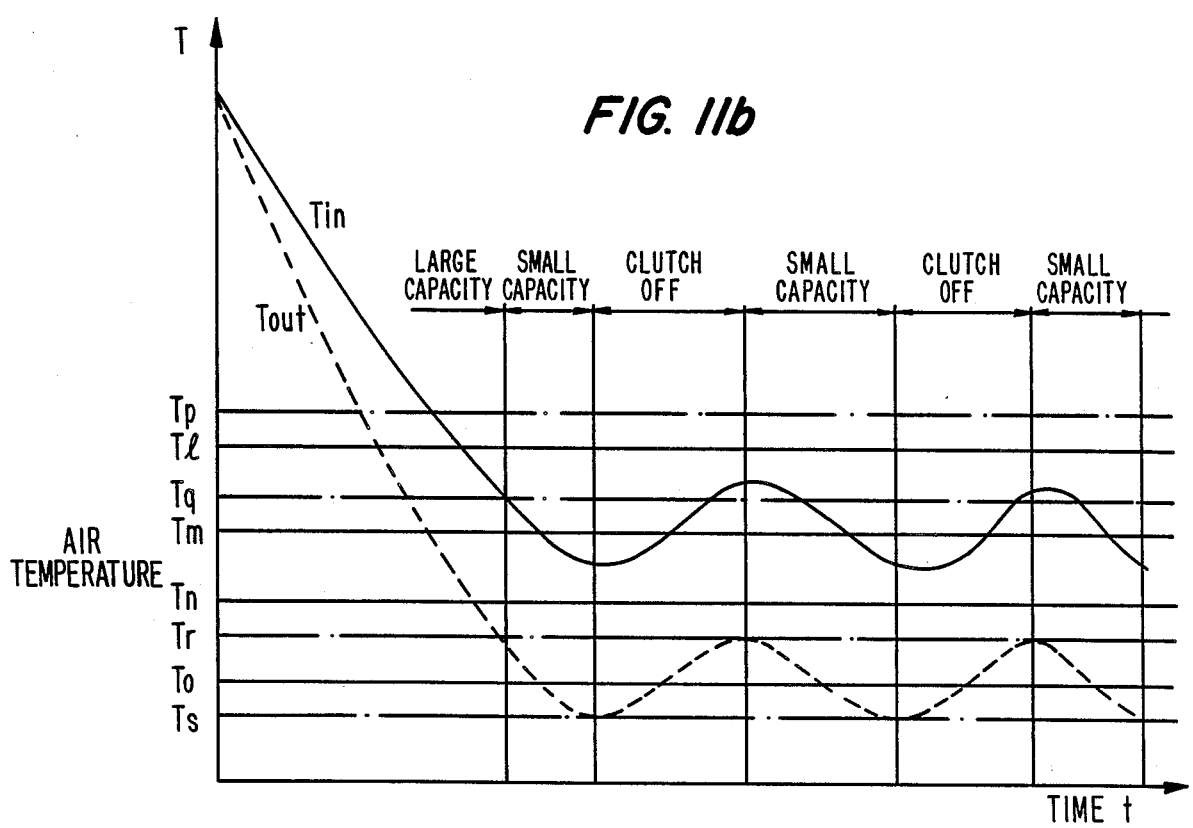

DEVICE FOR CONTROLLING CAPACITY OF VARIABLE CAPACITY COMPRESSOR

TECHNICAL FIELD

The present invention relates to a device for controlling the capacity of a compressor in an automotive air conditioning system, and more particularly, to a device that controls the capacity of the compressor in accordance with a change of refrigerant load.

BACKGROUND OF THE INVENTION

Automobile air conditioning systems are generally designed to achieve a predetermined air conditioning performance at a predetermined air conditioning load when the automobile is driven at an average range of speeds. But since compressors of automobile air conditioning systems are generally driven by automobile engines through an electromagnetic clutch, when an automobile engine is idling or being driven at low speeds, the rotational speed of a compressor driven by that engine is correspondingly low. Therefore, the performance of such an air conditioning system is adversely affected. On the other hand, when a vehicle is driven at high speeds, the rotational speed of the compressors is too high for efficient performance. In order to overcome these problems, electromagnetic clutches have been used to control the operation of compressors by intermittently stopping and starting the compressors.

However, there are many problems associated with intermittent stopping and starting of a compressor which is known as continuous clutch cycling. For example, when an engine is driven at high speed and the capacity of the air conditioning system is large, it is necessary for the electromagnetic clutch to be turned on and off frequently causing a "shock" each time. On the other hand, at low speed or when the vehicle engine is idling, the compressor may not be sufficiently driven to maintain a desired temperature in the automobile.

In order to solve the above-mentioned problems, a control system has been employed to control the capacity of a compressor in accordance with a detected temperature at the outlet side of the evaporator as disclosed in published Laid-open Japanese Patent Application No. 58-30. In such a system, the performance of the air conditioning system itself is not directly detected. For example, even though the temperature in the compartment of the automobile may be high, the capacity of the air conditioning system may be reduced when the temperature at the outlet side of the evaporator becomes lower than a predetermined temperature. Thus, the capacity of the system is insufficient to cool a compartment of the automobile as desired. In addition, when the automobile is being operated, the capacity of the air conditioning system is changed frequently, thereby placing great stress and strain on the air conditioning system.

In order to solve these and additional problems, a system which controls the capacity of the compressor by detecting the temperature of the outlet and inlet side of an evaporator and comparing the detected temperatures with predetermined temperatures is disclosed in U.S. Pat. No. 4,633,675. In this patent, sensors which are disposed at each of the described locations detect the air temperatures at respective sides of the evaporator. However, for example, when the sensors detect a decrease of temperature, even though the temperatures decrease to a predetermined temperature, sometimes the sensors do not cause a desired predetermined action to occur. Actually, the sensors cause a predetermined action after the temperatures decrease below the predetermined temperature, thereby not being able to timely control the temperature of the air. That is to say, the sensors do not cause an output signal to change the capacity of the compressor even though the temperature reaches a predetermined temperature. This can be caused by the sensitivity of the sensor not being high enough. The result is that the air conditioning capacity cannot be controlled immediately in response to the air conditioning load.

SUMMARY OF THE INVENTION

It is therefore a primary object of this invention to provide a device for controlling the capacity of a compressor in an automotive air conditioning system which can timely control the capacity of the compressor in accordance with changes of air conditioning load.

It is another object of this invention to provide a device for controlling the capacity of a compressor in an automotive air conditioning system which can reduce the intermittent operation of an electromagnetic clutch.

It is a further object of this invention to provide a device for controlling the capacity of a compressor in an automotive air conditioning system which can reduce discomfort of passengers in a compartment of an automobile due to temperature.

It is a further object of this invention to provide a device for controlling the capacity of a compressor in an automotive air conditioning system which can reduce the operating costs thereof.

The above objects of the present invention are achieved by providing a control device which includes a pressure sensor disposed on or near an outlet conduit of an evaporator for detecting a refrigerant pressure. A control unit compares a pressure change ratio based on the detected refrigerant pressures with a predetermined pressure change ratio and selects one of two ranges of predetermined values in accordance with the compared results, and further compares the refrigerant pressure with the predetermined values, thereby controlling the operation of an electromagnetic clutch and the capacity changing device of the compressor in accordance with the compared results.

Further objects, features, and other aspects of this invention will be understood from the following detailed description of the preferred embodiment of this invention with reference to the attached drawings.

BRIEF DESCRIPTION OF THE DRAWINGS

FIGS. 11a & 11b are graphs illustrating the change of temperature and pressure on evaporator under a medium air conditioning load and a high vehicle speed.

DETAILED DESCRIPTION OF THE PREFERRED EMBODIMENTS

Figure 1:
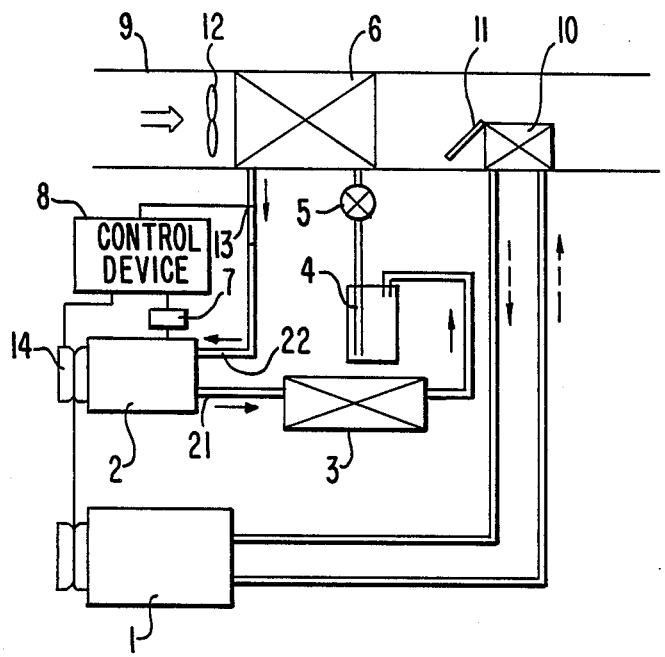
FIG. 1 is a block diagram of an automotive air conditioning system in accordance with one embodiment of this invention.

Referring to FIG. 1, there is shown an automotive air conditioning system which comprises a compressor 2 driven by an engine 1, a condenser 3, a receiver dryer 4, an expansion valve 5 and an evaporator 6 each of which is serially connected with one another to form a closed refrigerant circuit. Compressor 2 is provided with a conventional capacity changing mechanism 7. The capacity of compressor 2 can be varied by operation of a capacity changing mechanism 7 based on a signal input from a control device 8. Where compressor 2 is of the scroll type, capacity changing mechanism 7 may comprise an electromagnetic bypass valve which connects the inlet of the compressor to the intermediate fluid pockets through an intermediate chamber as shown in U.S. Pat. No. 4,642,034. As shown in FIG. 1, evaporator 6 is disposed on or near air duct 9. A heater 10 which has a damper 11 is disposed rearward of evaporator 6 on air duct 9 and a fan 12 is disposed forward of evaporator 6 on air duct 9. Heater 10 is connected to engine 1 through two conduits, so that a heater circuit is composed, and hot water is circulated in the heater circuit. The air which is circulated in a compartment of a vehicle is sent to the compartment through evaporator 6 and heater 10 by operation of fan 12. A pressure sensor 13 which is operatively connected to control device 8 is disposed on or near an outlet of evaporator 6 and detects refrigerant pressure PE therein.

In operation, control device 8 first calculates a pressure change ratio P/t of refrigerant pressure PE until refrigerant pressure PE reaches a first predetermined pressure value after compressor 2 is started, and then compares the calculated pressure change ratio P/t with a predetermined pressure change ratio. Based on the compared results, a range of pressure control values is selected, i.e., either a first range A of predetermined values Pa, Pb, Pc, Pd, or a second range B of predetermined values Pe, Pf, Pg, Ph is selected as the range of pressure control values. Thereafter, each predetermined value such as a first predetermined value Pa or Pe as a first predetermined pressure P1, a second predetermined value Pb or Pf as a second predetermined pressure P2, a third predetermined value Pc or Pg as a third predetermined pressure P3 and a fourth predetermined value Pd or Ph as a fourth predetermined pressure P4 is compared with refrigerant pressure PE which is detected by pressure sensor 13 at the outlet side of evaporator 6. The compared result is used by control device 8 to control capacity changing mechanism 7 or an electromagnetic clutch 14 which is mounted on compressor 2. Thus, the capacity of compressor 2 is either changed to another capacity by capacity changing mechanism 7 or maintained at its present capacity depending on the results of the comparisons. Additionally, electromagnetic clutch 14 may be intermittently operated to control the operation of compressor 2 based on the results of the comparisons.

Figure 2:
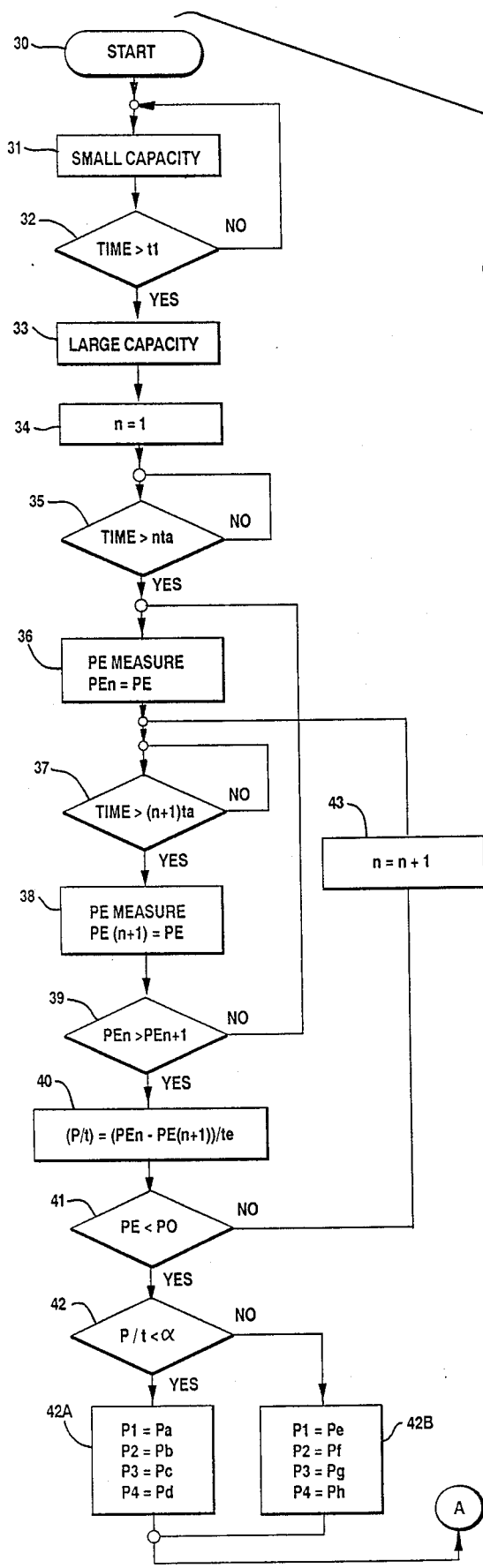
FIG. 2 is a flow chart illustrating the operation of a control device in accordance with one embodiment of this invention.
Figure 2:
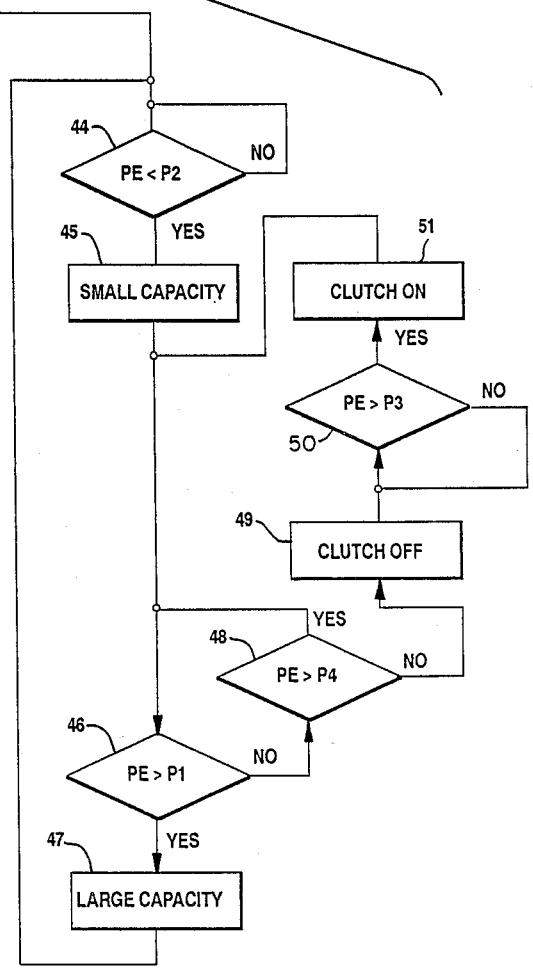
Figure 3A:
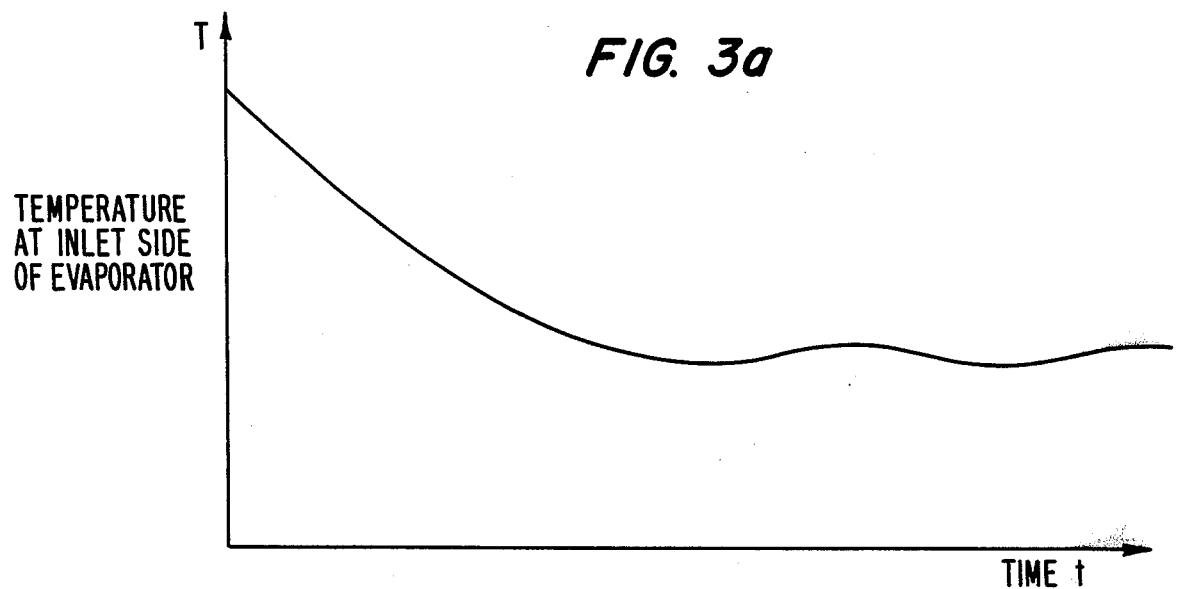
FIGS. 3a, 3b, 3c are graphs illustrating the change of pressure and temperature on an evaporator under high air conditioning load and normal vehicle speed.
Figure 3C:
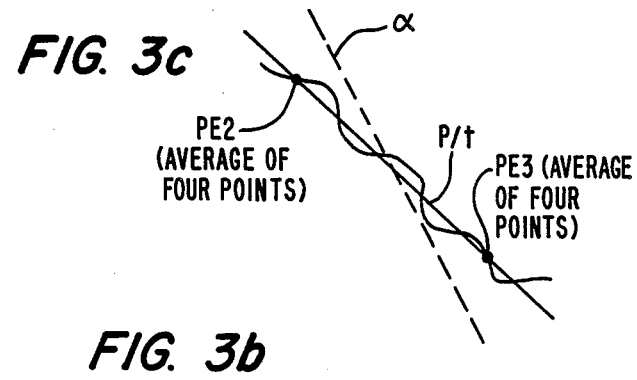
Figure 3B:
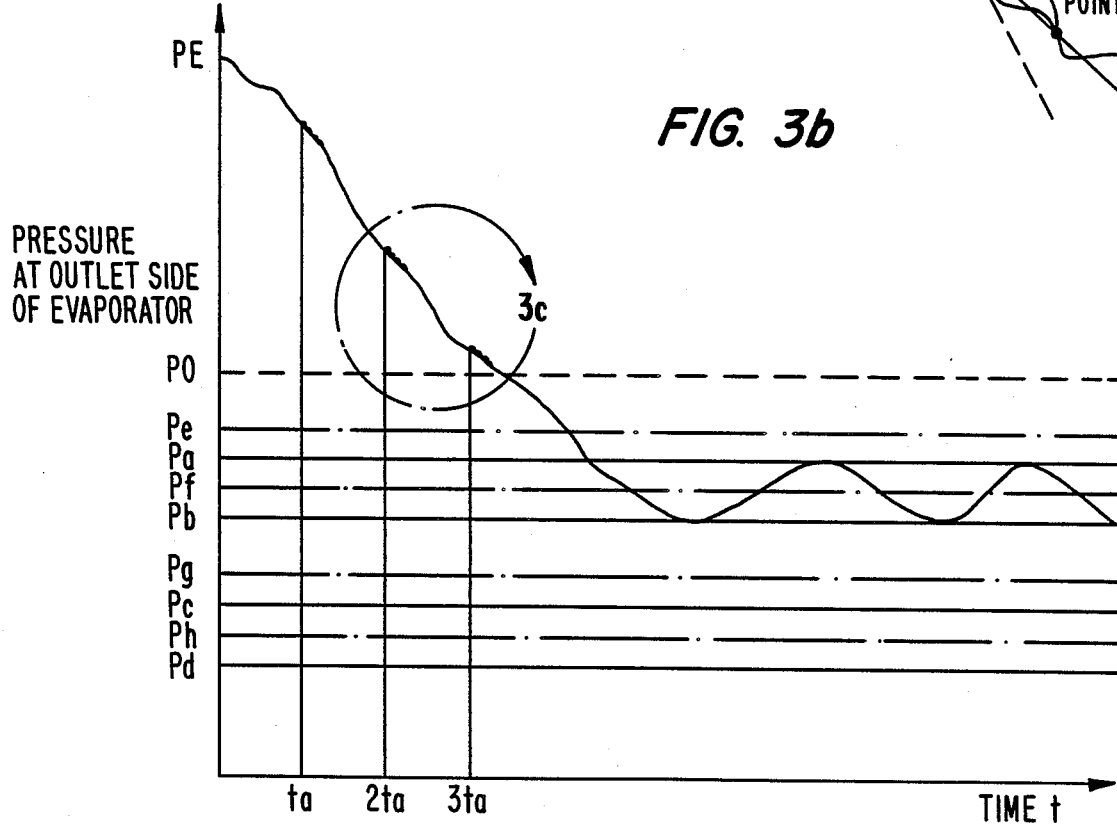
Figure 4A:
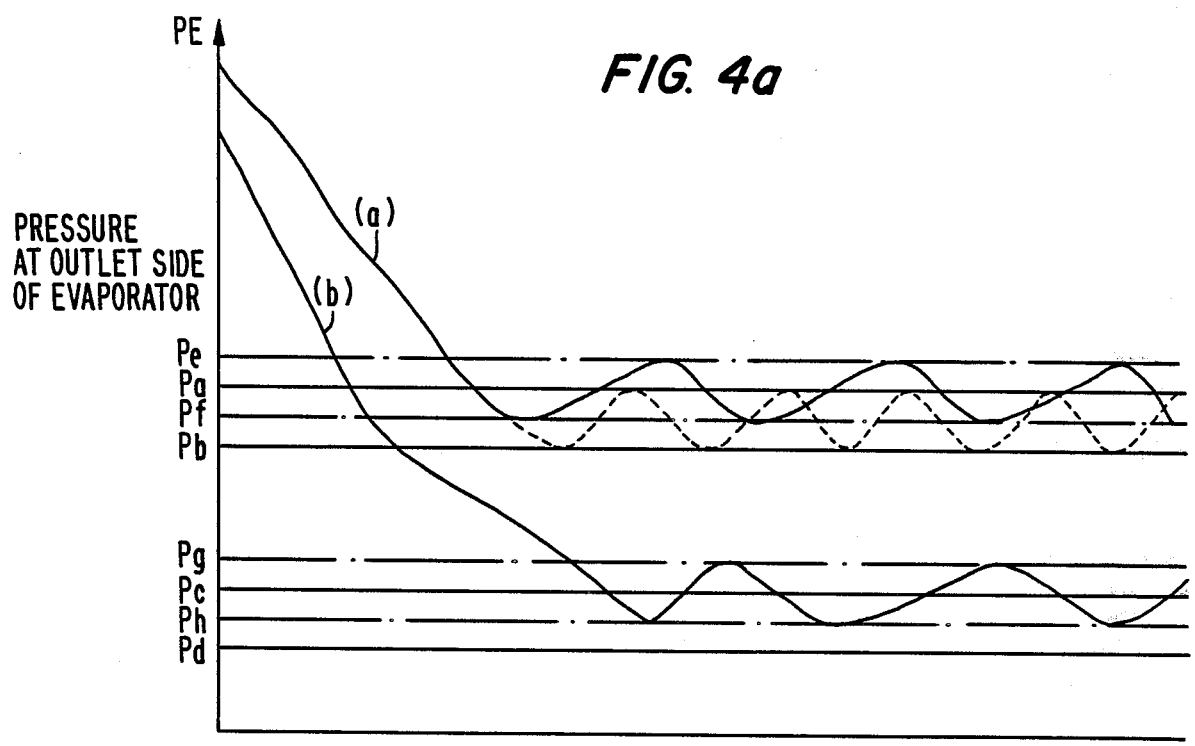
FIGS. 4a, 4b are graphs illustrating the change of pressure and temperature on an evaporator under a medium air conditioning load and plural vehicle speeds.
Figure 4B:
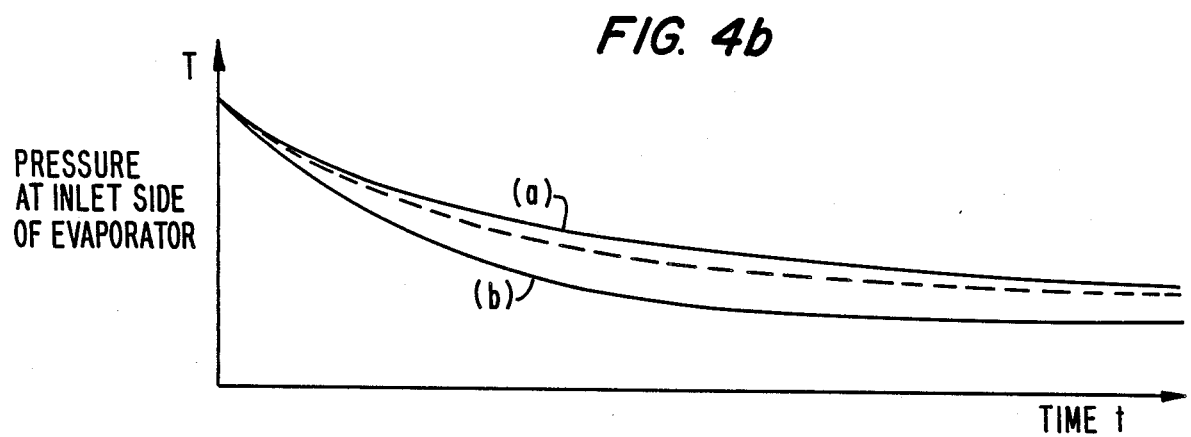

Referring to FIG. 2, there is shown a flow chart detailing the operation of a control system in accordance with one embodiment of this invention. In this embodiment, second range B of predetermined values Pe–Ph is predetermined to be higher than the corresponding values of the first range A of predetermined values Pa–Pd as shown in FIGS. 3 and 4. When the air conditioning system is turned on (step 30) compressor 2 begins to operate at a predetermined small capacity (step 31). After it is determined that the air conditioning system has been operated for a predetermined time t1 at a small capacity (step 32), the capacity of compressor 2 is changed to a large capacity (step 33). The time t1 for which the compressor is operated at a small capacity is typically on the order of seconds, but it would be obvious to one of ordinary skill in the art to vary t1 without undue experimentation. In this embodiment the variable n preferably an integer is predetermined to be equal to one (step 34). After it is determined that the air conditioning system has been operated for a predetermined time nta, ta being a predetermined time at a predetermined large capacity (step 35), refrigerant pressure PE at the outlet side of evaporator 6 is detected a number of times by pressure sensor 13 during a predetermined time interval (step 36). The average of the detected refrigerant pressure values of PE is then calculated and stored at PE1 (step 36). After a predetermined time $(n+1)ta$ has passed from the starting of the air conditioning system (step 37), refrigerant pressure PE is detected several times by pressure sensor 13. The average of these detected refrigerant pressures PE is also calculated and stored as PE2 (step 38). The detected pressure PE1 is then compared with pressure PE2 (step 39). If pressure PE1 is greater than pressure PE2, a pressure change ratio P/t is calculated based on the above two pressure values PE1 and PE2 (step 40). This pressure change ratio (P/t) is calculated as $P/t = (PEn - PE(n+1))/ta$. If PE1 is less than PE2 a signal causes the control operation to jump from step 39 to step 36. Next, pressure PEn is compared with a predetermined pressure PO (step 41). PO is chosen to be a value greater than first predetermined value Pe in the second range B. If predetermined pressure PO is greater than pressure PEn, pressure change ratio P/t is compared with a predetermined pressure change ratio $\alpha$ (step 42). If PO is less than PEn, a signal causes the control operation to jump from step 41 to step 43 and the value of n is incremented by one (step 43). The control operation then returns to step 37 to calculate the next pressure change ratio P/t, with such a calculation being repeated every ta seconds until pressure PEn is less than predetermined pressure PO. In step 40, the pressure change ratio P/t which was previously calculated is now deleted, and only the newest value of pressure change ratio P/t is stored. If pressure change ratio P/t is less predetermined pressure changing ratio $\alpha$ (step 42), first range A of predetermined values Pa–Pd is selected as the predetermined range of values of pressure (step 42A). If pressure change ratio P/t is greater than the predetermined pressure change ratio α, a second range B of predetermined values Pe–Ph is selected as the predetermined range of values of pressure (step 42B). After either first range A or second range B has been selected, refrigerant pressure PE is compared with second predetermined pressure P2, that is second predetermined value Pb or Pf depending on whether range A or range B has been previously chosen (step 44). If refrigerant pressure PE is less than second predetermined pressure P2, a control signal causes the capacity changing mechanism 7 to change the capacity of compressor 2 to a small capacity (step 45). If PE is greater than P2, a control signal causes the control operation to return to step 44, and the operation of step 44 is repeated until refrigerant pressure PE is less than second predetermined pressure P2. When PE is less than P2, after the capacity of the compressor is changed to a small capacity (step 45), refrigerant pressure PE is compared with first predetermined pressure P1, that is, first predetermined value Pa or Pe depending on whether range A or range B has been previously chosen (step 46). If refrigerant pressure PE is greater than first predetermined pressure P1, a control signal causes the capacity of compressor 2 to be changed to a large capacity (step 47). If PE is less than P1, refrigerant pressure PE is compared with fourth predetermined pressure P4, that is, fourth predetermined value Pd or Ph depending on whether range A or range B has been previously chosen (step 48). If refrigerant pressure PE is greater than fourth predetermined pressure P4, a control signal causes the control operation to return to step 46 to compare refrigerant pressure PE with first predetermined pressure P1. If PE is less than P4, a control signal causes the control operation to jump to step 49, and electromagnetic clutch 14 is turned off (step 49). In the event that clutch 14 is turned off, refrigerant pressure PE is compared with third predetermined pressure P3, that is, third predetermined value Pc or Pg depending on whether range A or range B has been previously chosen (step 50). If refrigerant pressure PE is greater than third predetermined pressure P3, electromagnetic clutch 14 is turned on (step 51), and thereafter a control signal causes the control operation to return to step 46. If PE is less than P3, a control signal causes the control operation to return to step 50 and the operation of step 50 is repeated until refrigerant pressure PE is greater than third predetermined pressure P3.

With reference to FIG. 3, a graph illustrating the change of pressure at the outlet side of the evaporator and temperature of air at the inlet side of the evaporator under a high air conditioning load condition and normal vehicle speed is shown. As mentioned above, second range B of predetermined values Pe–Ph is predetermined to be higher than the first range A of predetermined values Pa–Pd. Since the conditions are high air conditioning load and normal vehicle speed, the first range of values A is selected to cool the air more quickly. After compressor 2 is started, the temperature of the air in the compartment of the vehicle gradually decreases. Refrigerant pressure PE at the outlet of evaporator 6 gradually decreases in accordance with the change of air temperature. When refrigerant pressure PE decreases below second predetermined value Pb, the capacity of compressor 2 is changed to a small capacity by operation of capacity changing mechanism 7. Thereafter, since the air conditioning load is high, the capacity of compressor 2 is insufficient to handle the high air conditioning load. Refrigerant pressure PE thus gradually increases with the increasing air temperature. When refrigerant pressure PE reaches first predetermined value Pa, the capacity of compressor 2 is changed to a large capacity again, and refrigerant pressure PE gradually decreases in accordance with the decreasing air pressure. If the surrounding conditions and the rotational speed of compressor 2 do not fluctuate greatly, the above control operation of control device 8 is repeated.

Referring to FIG. 4, there is shown a graph illustrating the change of temperature and pressure on the evaporator under a normal air conditioning load and plural vehicle speeds. Curve (a) represents the change at low vehicle speeds and curve (b) represents the change at high vehicle speeds. Since pressure change ratio P/t with respect to curves (a) and (b) is larger than predetermined pressure changing ratio α, second range B of predetermined valued Pe–Ph is selected as the range predetermined pressure values. With reference to curve (a), since the rotational speed of compressor 2 is low, the capacity of compressor 2 is insufficient to handle the normal air conditioning load. However, refrigerant pressure PE gradually decreases in accordance with the change of air temperature although the rate of decrease of the refrigerant pressure is slow compared with curve (b). If refrigerant pressure PE decreases and falls below second predetermined value Pf, the capacity of compressor 2 is changed to a small capacity. Refrigerant pressure PE thus gradually increases in accordance with the changing air temperature. If refrigerant pressure PE reaches first predetermined value Pe, the capacity of compressor 2 is changed to a large capacity again, and refrigerant pressure PE gradually decreases in accordance with the changing air temperature. If the surrounding conditions and the rotational speed of compressor 2 do not fluctuate greatly, the above operation of compressor 2 is repeated.

Under the same conditions as mentioned above, if the first range A of predetermined values Pa–Pd is selected as the predetermined range of values of pressure, where the values of the first range of values are below the corresponding values of the second range B of predetermined values Pe–Ph, the cycling period for changing the capacity of compressor 2 is shortened as shown by the dotted curve as compared with the solid curve. That is, the frequency at which the capacity of the compressor changes to a higher frequency. Therefore, under these conditions, by selecting the second range B of values Pe–Ph, the frequency at which the capacity is changed can be reduced.

With reference to curve (b), since the rotational speed of compressor 2 is high, refrigerant pressure PE rapidly decreases in accordance with the changing air temperature and reaches second predetermined value Pe relatively rapidly. The capacity of compressor 2 is changed to a small capacity at second predetermined value Pf. However, since compressor 2 is driven at high speed, the capacity of compressor 2 still exceeds the normal air conditioning load. Therefore, refrigerant pressure PE continues to decrease until it reaches fourth predetermined value Ph. Electromagnetic clutch 14 is turned off at fourth predetermined value Ph to prevent frosting on evaporator 6. Thereafter, refrigerant pressure PE gradually increases with the air temperature. If refrigerant pressure PE becomes greater than third predetermined value Pg, electromagnetic clutch 14 is turned on, and compressor 2 is operated at a small capacity again. This control operation of control device 8 is repeated between third predetermined value Pg and fourth predetermined value Ph.

In the above embodiment, the preferred predetermined pressure values are selected in accordance with the newest pressure change ratio P/t just before refrigerant pressure PE reaches predetermined pressure PO. Similarly, predetermined pressure values can be selected by using the average pressure change ratio wherein the average pressure change ratio is the average pressure from the start of compressor 2 until refrigerant pressure PE reaches predetermined pressure PO. In this embodiment, it is also preferred that Pe>Pa>Pf>Pb>Pg>Pc>Ph>Pd. These values may be predetermined by one of ordinary skill in the art without undue experimentation.

Figure 5:
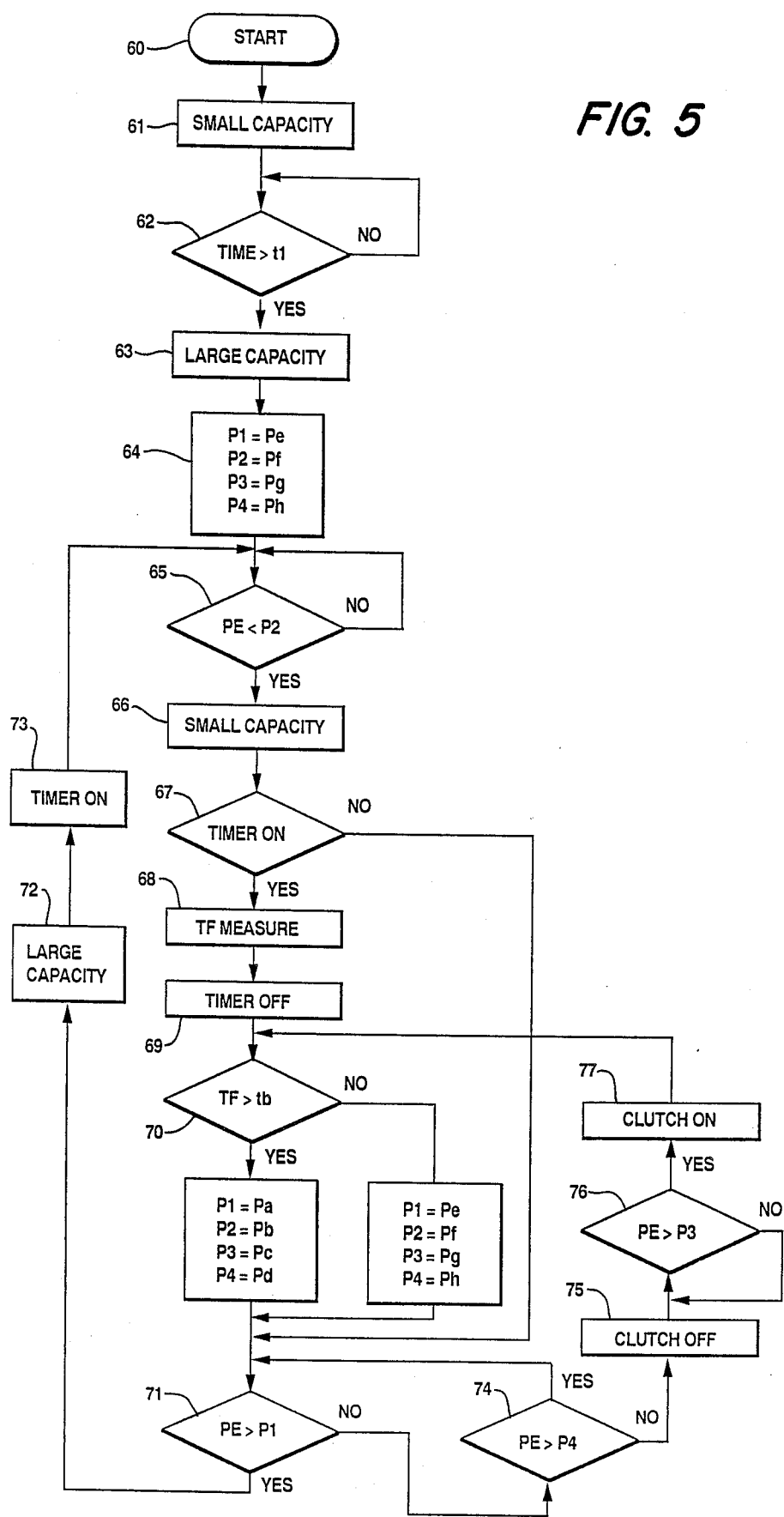
FIG. 5 is a flow chart illustrating the operation of a control device in accordance with another embodiment of this invention.

With reference to FIG. 5, a flow chart with respect to the operation of a control system in accordance with another embodiment of this invention is shown. When the air conditioning system is turned on (step 60), compressor 2 is initially operated at a predetermined small capacity (step 61). After the air conditioning system has been operated for a predetermined time t1, typically on the order of seconds, at the small capacity (step 62), the capacity of compressor 2 is changed to a large capacity (step 63). In step 64, first predetermined pressure P1, second predetermined pressure P2, third predetermined pressure P3 and fourth predetermined pressure P4 are set equal to first predetermined value Pe, second predetermined value Pf, third predetermined value Pg and fourth predetermined value Ph of second range B, respectively. Next, refrigerant pressure PE at the outlet side of evaporator 6 is compared with second predetermined value P2 (step 65). If refrigerant pressure PE is less than predetermined value P2, the capacity of compressor 2 is changed to a small capacity (step 66). If PE is greater than P2, refrigerant pressure PE continues to be compared with second predetermined pressure P2 until refrigerant pressure PE is less than second predetermined value P2. Once it is determined that PE is less than P2, it is detected whether a timer is turned on or off (step 67). A timer may be built into control device 8 or may be externally provided and operatively connected to the circuit of FIG. 1 in a manner that would be obvious to one of ordinary skill in the art. If the timer is on, time TF, the time for which compressor 2 is operated at a large capacity, is measured (step 68). If the timer is not on, a control signal causes the control operation to jump to step 71. If the timer was detected as being on, after TF is measured the timer is turned off (step 69). Next, measured time TF is compared with a predetermined time tb (step 70). If time TF is greater than predetermined time tb, first range A of predetermined values Pa-Pd is selected as the range of predetermined values of pressure. Time tb is predetermined in accordance with the total capacities of the compressor, evaporator, fan, etc., as will be appreciated by one of ordinary skill in the art. If TF is less than tb, second range B of predetermined values Pe-Ph is selected as the predetermined values of pressure. After the desired range A or B is selected, refrigerant pressure PE is compared with first predetermined pressure P1, that is, first predetermined value Pa or Pe depending on whether range A or range B has been previously selected (step 71). If refrigerant pressure PE is greater than first predetermined pressure P1, the capacity of compressor 2 is changed to a large capacity (step 72) and a timer is turned on (step 73), and the control operation returns to step 65. If PE is less than P1 at step 71, refrigerant pressure PE is compared with fourth predetermined pressure P4, that is, fourth predetermined value Pd or Ph depending on whether range A or range B has been previously selected (step 74). If refrigerant pressure PE is greater than fourth predetermined pressure P4, the control operation returns to step 71. If PE is less than P4, electromagnetic clutch 14 is turned off (step 75) and refrigerant pressure PE is compared with third predetermined pressure P3, that is third predetermined value Pc or Pg depending on whether range A or range B has been previously selected (step 76). If refrigerant pressure PE is greater than third predetermined pressure P3, electromagnetic clutch 14 is turned on (step 77), and the control operation returns to step 70. If PE is less than P3, the control operation returns step 76, and the control operation of step 76 is repeated until refrigerant pressure PE is greater than third predetermined pressure P3.

Figure 6:
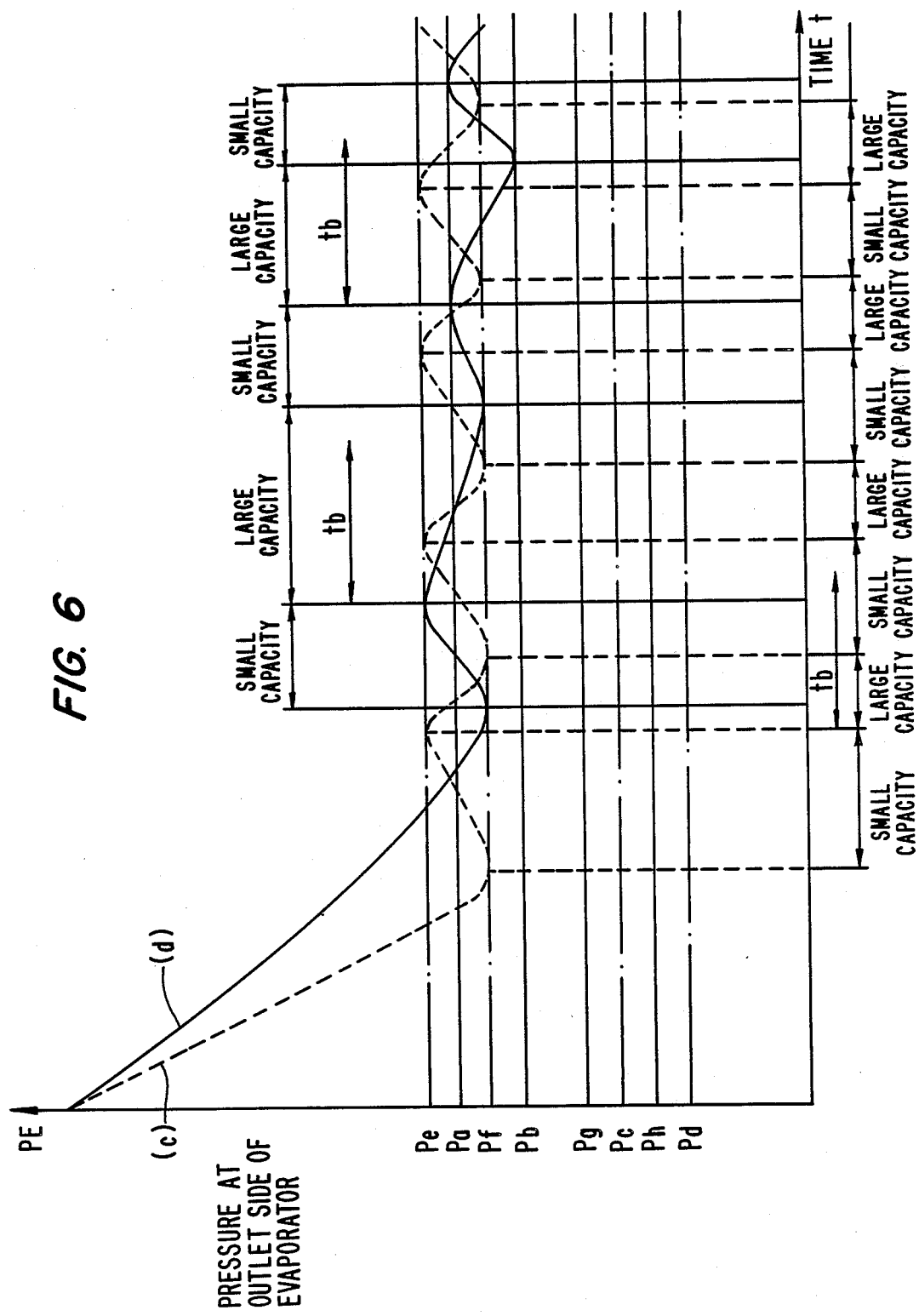
FIG. 6 is a graph illustrating the change of pressure on an evaporator under plural air conditioning loads and a normal vehicle speed.

Referring to FIG. 6, a graph illustrating the change of pressure on the evaporator under a plurality of air conditioning load conditions and a normal vehicle speed is shown. Curve (c) represents the change under a low air conditioning load and curve (d) represents the change curve under a high air conditioning load. With reference to curve (c), after the air conditioning system is turned on, refrigerant pressure PE gradually decreases in accordance with the change of air temperature. If the air conditioning load is low, time TF, the time for which compressor 2 is operated at a large capacity, does not become greater than predetermined time tb. Therefore, the predetermined range of pressures remains to be the second range B of predetermined values Pe-Ph as predetermined in an earlier step.

Referring to curve (d), after the air conditioning system is turned on, refrigerant pressure PE decreases less rapidly than curve (c). Since the air conditioning load is high, time TF, for which compressor 2 is operated at large capacity, becomes greater than predetermined time tb. Therefore, the predetermined range of pressures is changed to the first range A of predetermined values Pa-Pd. Thereafter, when time TF becomes less than predetermined time tb, the predetermined range of pressures is changed back to second range B of predetermined values Pe-Ph.

Figure 7:
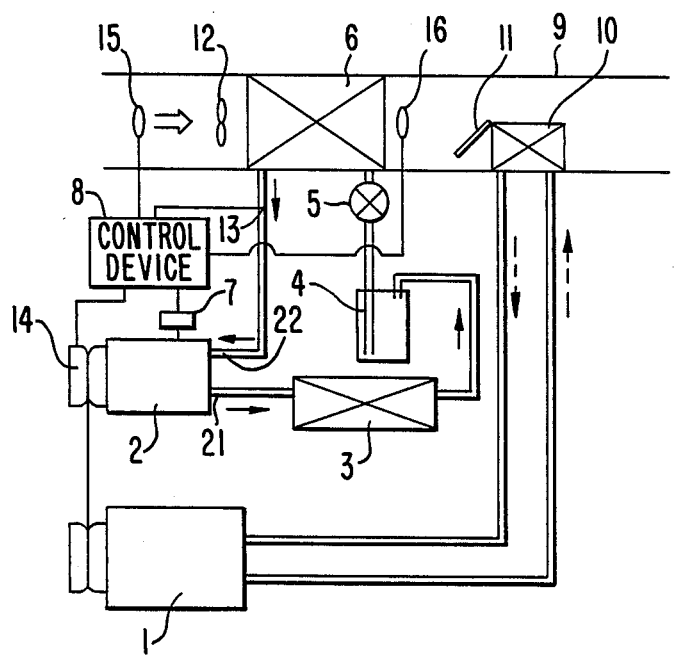
FIG. 7 is a block diagram of an automotive air conditioning system in accordance with another embodiment of this invention.

Referring to FIG. 7, there is shown an automotive air conditioning system in accordance with a further embodiment of this invention. The construction of this automotive air conditioning system is similar to that shown in FIG. 1 and like components are accorded the same reference numerals and the description of the previously described functions is omitted to simplify the present specification. This embodiment varies from the previous embodiment mainly in the following manner. In addition to pressure sensor 13, temperature sensors 15 and 16 are disposed at the inlet and outlet side of evaporator 6 to detect the inlet and outlet air temperatures thereat. Sensors 15 and 16 are operatively connected to control device 8. Control device 8 controls capacity changing mechanism 7 based in part on the temperatures detected by sensors 15 and 16.

Figure 8:
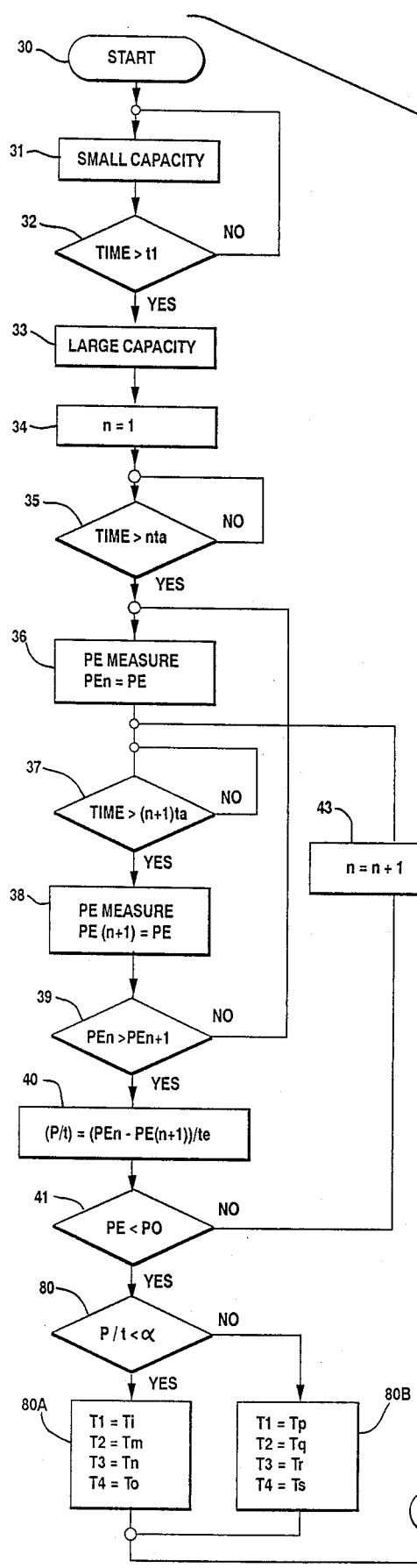
FIG. 8 is a flow chart illustrating operation of a control device in accordance with an embodiment of this invention.
Figure 8:
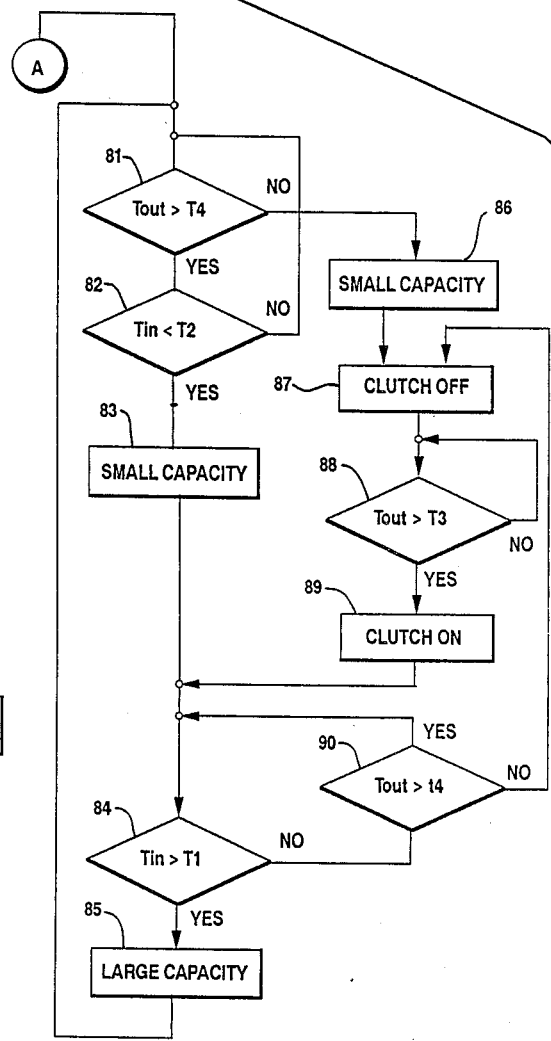

With reference to FIG. 8, a flow chart of the control system in accordance with the further embodiment of this invention is shown. Since the control operation of control device 8 for this embodiment is substantially the same as those shown in the flow chart of FIG. 2 from step 30 to 41, the steps of FIG. 8 that correspond to like steps of FIG. 2 are accorded the same reference numbers and the description of the previously described steps is omitted to simplify the specification.

Figure 9A:
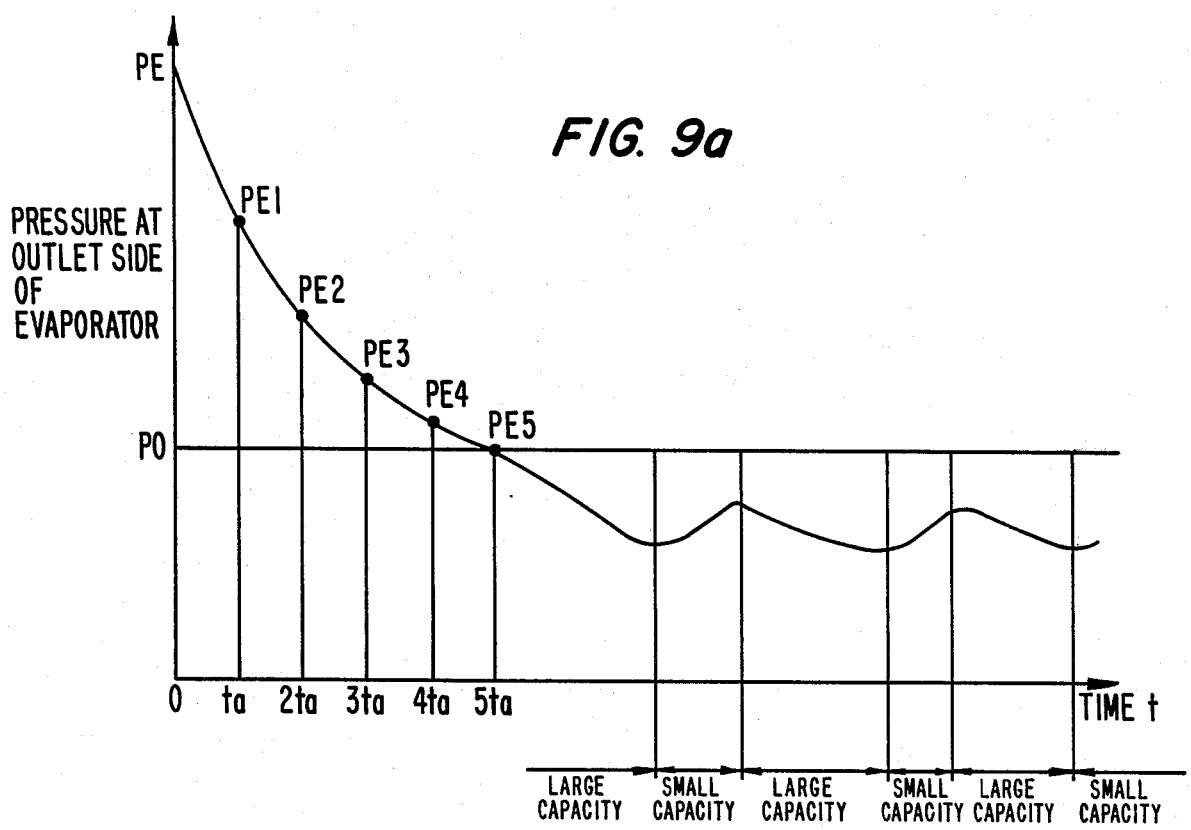
FIGS. 9a, 9b are graphs illustrating the change of pressure on an evaporator under a high air conditioning load and a normal vehicle speed.
Figure 9B:
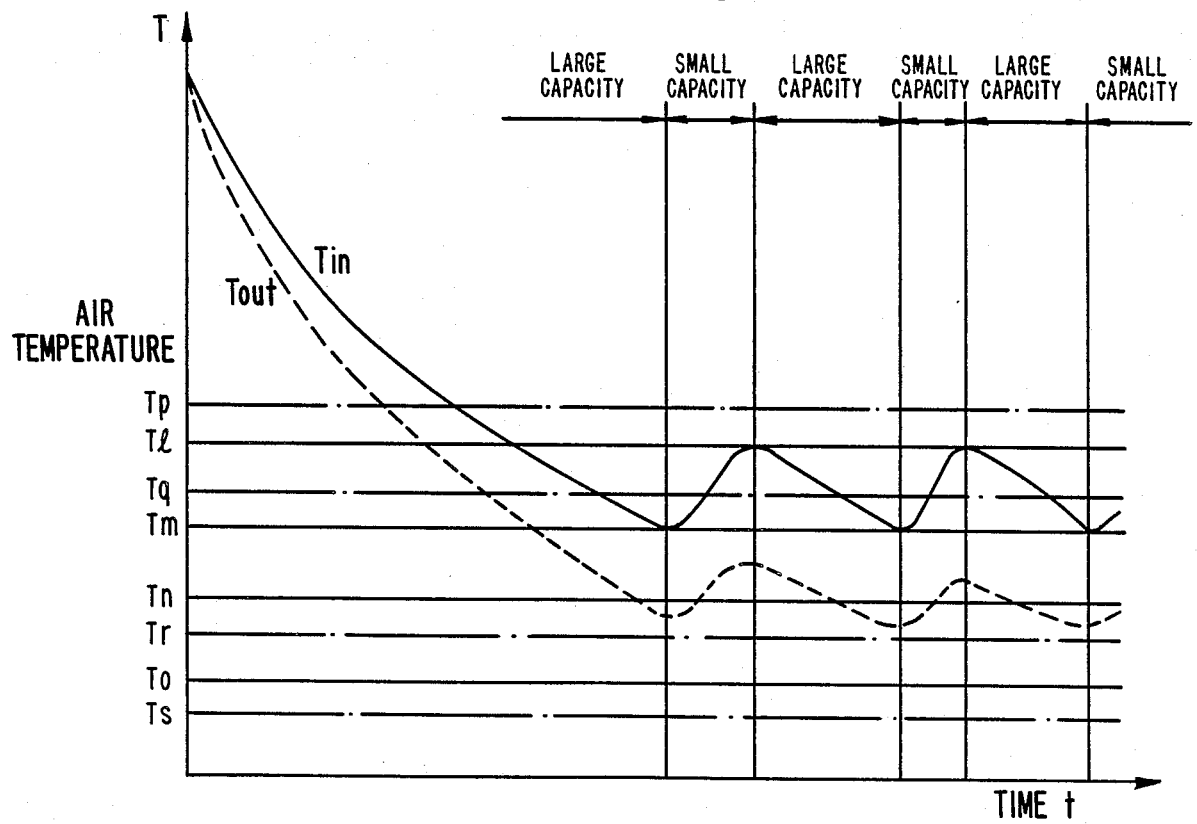
Figure 10A:
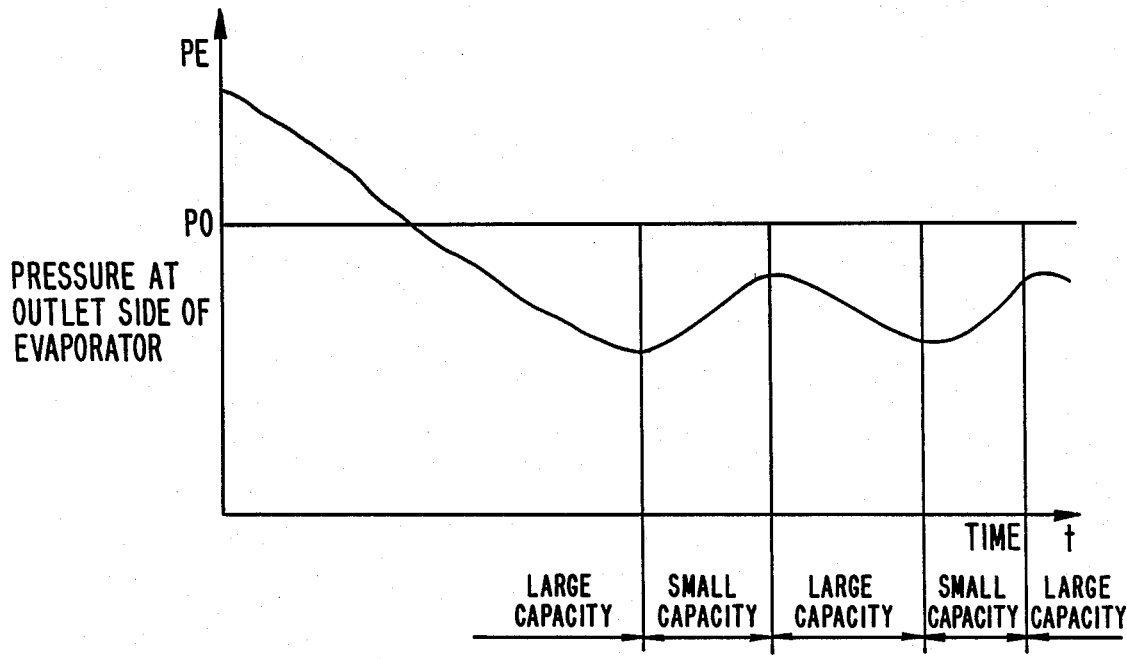
FIGS. 10a & 10b are graphs illustrating the change of pressure on an evaporator under a medium air conditioning load and a low vehicle speed.
Figure 10B:
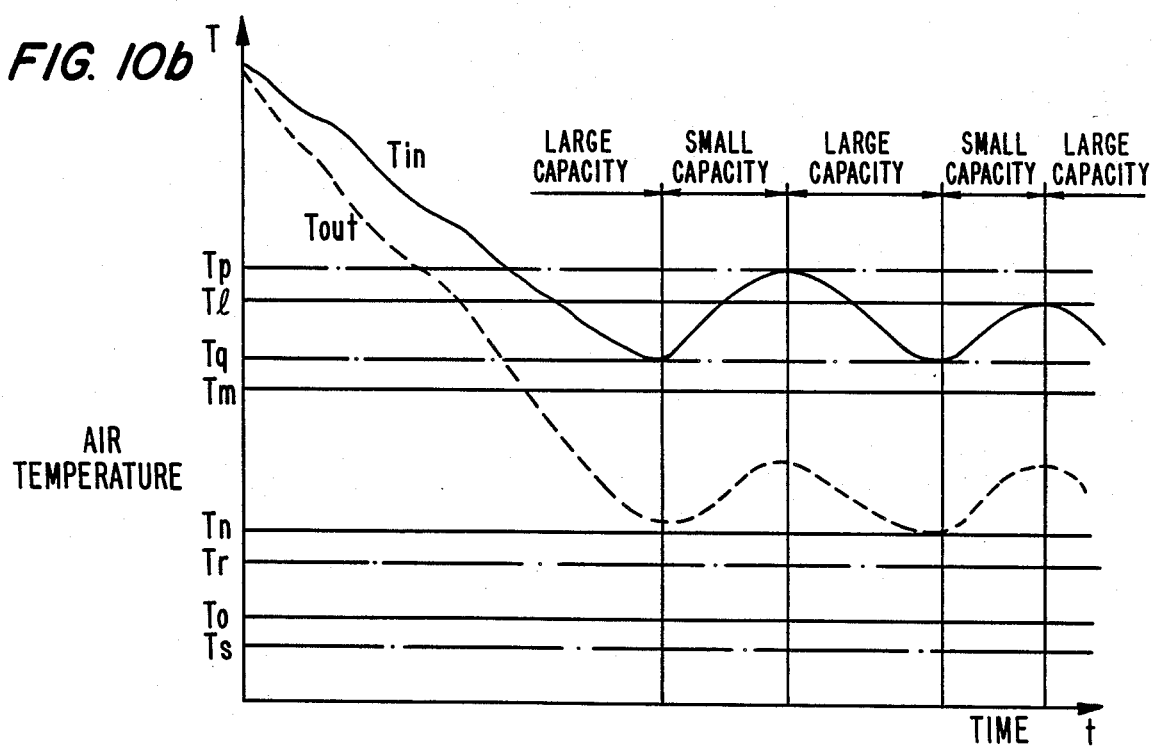

In step 80, pressure change ratio P/t is compared with a predetermined pressure change ratio α. First and second predetermined temperatures Tp and Tq of fourth range D of predetermined temperatures Tp, Tq, Tr, Ts are predetermined to be greater than respective predetermined values Tl and Tm of third range C of predetermined temperatures Tl, Tm, Tn, To. Third and fourth predetermined values Tn and To of third range C are predetermined to be greater than respective predetermined temperatures Tr and Ts of fourth range D as shown in FIGS. 9, 10 and 11. Preferably, Tp>Tl>Tq>Tq>Tm>Tn>Tr>To>Ts. If pressure change ration P/t is less than predetermined pressure change ratio α, since the air conditioning load is high, third range C of predetermined values Tl–To is selected as the range of predetermined temperatures (step 80A). First and second predetermined values Tl and Tm are selected as first and second predetermined temperatures T1 and T2 respectively so that the compressor 2 can be maintained at a large capacity for a longer time, and third and fourth predetermined values Tn and To are selected as third and fourth predetermined temperatures T3 and T4 respectively to prevent frosting on evaporator 6. If pressure change ratio P/t is greater than the predetermined pressure ratio change ratio, since the air conditioning load is low, fourth range D of predetermined values Tp–Ts is selected as the range of predetermined temperatures (step 80B). First and second predetermined values Tp and Tq are selected as first and second predetermined temperatures T1 and T2 respectively so that the time that compressor 2 is operated at a large capacity is shortened and third and fourth predetermined values Tr and Ts are selected as third and fourth predetermined temperatures T3 and T4 respectively so that the time that compressor 2 is operated at a small capacity is lengthened.

Referring again to FIG. 8, air temperature Tout which is detected at the outlet side of evaporator 6 is compared with fourth predetermined temperature T4, that is fourth predetermined value To or Ts depending on whether range C or D has previously been selected (step 81). If air temperature Tout is greater than fourth predetermined temperature T4, air temperature Tin, which is detected at the inlet side of evaporator 6, is compared with second predetermined temperature T2, that is, second predetermined value Tm or Tq depending on whether range C or D has previously been selected (step 82). If air temperature Tin is less than second predetermined temperature T2, the capacity of compressor 2 is changed to a small capacity (step 83). If Tin is greater than T2, the control operation returns to step 81. After the capacity of compressor 2 is changed to a small capacity (Step 83) air temperature Tin is compared with first predetermined temperature T1, that is, first predetermined value Tl of Tp depending on whether range C or D has previously been selected (step 84). If air temperature Tin is greater than first predetermined temperature T1, the capacity of compressor 2 is changed to a large capacity (step 85), and thereafter the control operation returns to step 81.

If air temperature Tout is determined to be less than fourth predetermined temperature T4 in step 81, the capacity of compressor 2 is changed to a small capacity (step 86) and electromagnetic clutch 14 is turned off (step 87). Thereafter, air temperature Tout is compared with third predetermined temperature T3, that is third predetermined value Tn or Tr depending on whether range C or D has previously been selected (step 88). If air temperature Tout is greater than third predetermined temperature T3, electromagnetic clutch 14 is turned on (step 89) and the control operation returns to step 84. If Tout is less than T3, the control operation returns to step 88 is repeated until Tout is greater than T3.

In step 84, if air temperature Tin is less than first predetermined temperature T1, air temperature Tout is compared with fourth predetermined temperature T4 (step 90). If air temperature Tout is greater than fourth predetermined temperature T4, the control operation returns to step 84. If Tout is less than T4, a control signal causes the control operation to jump to step 87 and electromagnetic clutch 14 is turned off (step 87). The control operation continues from step 87 in the manner described above.

With reference to FIG. 9, a graph illustrating the change of pressure and temperature of an evaporator under a high air conditioning load and normal speed is shown. The operation of control device 8 from steps 30 to 41 is substantially the same as shown in FIG. 2. Since pressure changing ratio P/t, under a high air conditioning load is less than predetermined pressure change ratio α, third range C of predetermined values Tl–To is selected as the range of predetermined temperatures. In operation, after the air conditioning system is turned on, the air temperature in a compartment of the automobile gradually decreases. When air temperature Tin reaches second predetermined temperature T2, that is, second predetermined value Tm, the capacity of compressor 2 is changed to a small capacity. Under these conditions, since the air conditioning capacity of compressor 2 is less than the air conditioning load, air temperature Tin gradually increases. If air temperature Tin attains first predetermined temperature T1, that is, first predetermined value Tl, the capacity of compressor 2 is changed to a large capacity. Since the air conditioning capacity of compressor 2 operating at large capacity is greater than the air conditioning load, air temperature Tin gradually decreases again. The above control operation of control device 8 is repeated.

With reference to FIG. 10, a graph illustrating the change of temperature and pressure on an evaporator under a medium air conditioning load and low speed is shown. Under these conditions, since pressure change ratio P/t is greater than predetermined pressure change ratio α, fourth range D of predetermined values Tp–Ts is selected as the range of predetermined temperatures. In operation, after the air conditioning system is turned on, the air temperature in the compartment of the automobile gradually decreases. Air temperature Tin also decreases with the air temperature in the compartment. If air temperature Tin reaches second predetermined temperature T2, that is, second predetermined value Tq, the capacity of compressor 2 is changed to a small capacity. Although the air conditioning load is medium, since vehicle speed is low, the air conditioning capacity of compressor 2 is insufficient to handle the air conditioning load. Therefore, air temperature Tin gradually increases. Thereafter, when air temperature Tin attains first predetermined temperature T1, that is, first predetermined value Tp, the capacity of compressor 2 is changed to a large capacity, thereby decreasing air temperature Tin again. The above control operation of control device 8 is repeated if the operating conditions are not varied extremely.

With reference to FIG. 11, a graph illustrating the change of temperature and pressure on an evaporator under a medium air conditioning load and high vehicle is shown. Since pressure change ratio P/t is greater than predetermined pressure change ratio α, fourth range D of predetermined values Tp–Ts is selected as the predetermined range of temperatures. In operation, after the air conditioning system is turned on, the air temperature in the compartment of the automobile gradually decreases. If air temperature Tin reaches second predetermined temperature T2, that is, second predetermined value Tq, the capacity of compressor 2 is changed to a small capacity. However, since compressor 2 is driven at high speed, the air conditioning capacity of compressor 2 is still greater than the medium air conditioning load. Therefore, air temperature Tin continues to further decrease. Thereafter, if air temperature Tout reaches fourth predetermined temperature T4, that is, fourth predetermined value Ts, electromagnetic clutch 14 is turned off to prevent frosting on evaporator 6. Thereafter, air temperature Tout gradually increases. If air temperature Tout reaches third predetermined temperature T3, that is, third predetermined values Tr, electromagnetic clutch 14 is turned on, thereby driving compressor 2 at a small capacity again. The capacity control of control device 8 is repeated if the operating conditions are not varied extremely.

This invention has been described in detail in connection with the preferred embodiment but these are for examples only and the invention is not restricted thereto. It will be readily understood, by those skilled in the art that other variations and modifications can be made within the scope of this invention.

We claim:

1. A device for controlling the capacity of a variable compressor having an evaporator, an electromagnetic clutch and compressor capacity changing means, said device comprising:

pressure detector means operatively connected for detecting a refrigerant pressure at an outlet side of said evaporator to determine at least a first refrigerant pressure and a second refrigerant pressure; and control means for controlling said electromagnetic clutch and said capacity changing means, said control means including:

first comparison means for comparing said first detected refrigerant pressure with said second detected refrigerant pressure and providing a first control signal when said first detected refrigerant pressure is greater than said second detected refrigerant pressure, wherein a pressure change ratio is calculated based on the comparison of said first and second detected refrigerant pressures and the presence of said first control signal, second comparison means for comparing one of said detected refrigerant pressures with a predetermined pressure and providing a second control signal when said one of said detected refrigerant pressures is below said predetermined pressure, third comparison means for comparing said calculated pressure change ratio with a predetermined pressure change ratio in a response to the comparison by said second comparison means and the presence of said second control signal, said third comparison means providing a third control signal when said calculated pressure change ratio is less than said predetermined pressure change ratio, wherein in response to said third control signal, first, second, third and fourth predetermined pressures are set equal to respective values of a first range of predetermined values, and in the absence of said third control signal, first, second, third and fourth predetermined pressure values are set equal to respective values of a second range of predetermined pressure values, fourth comparison means for comparing one of said detected refrigerant pressures with said second predetermined pressure and providing a fourth control signal when said one of said detected refrigerant pressures is less than said second predetermined pressure, wherein said capacity changing means changes the capacity of said compressor to a small capacity in response to said fourth control signal, fifth comparison means for comparing one of said detected refrigerant pressures with said first predetermined pressure and providing a fifth control signal when said one of said detected refrigerant pressures is greater than said first predetermined pressure, wherein said capacity changing means changes the capacity of said compressor to a large capacity in response to said fifth control signal, sixth comparison means for comparing one of said detected refrigerant pressures with a fourth predetermined pressure in response to the comparison by said fifth comparison means and the absence of said fifth control signal, said sixth comparison means providing a sixth control signal when said one of said detected refrigerant pressures is greater than said fourth predetermined pressure, wherein said electromagnetic clutch is turned off in response to the absence of said sixth control signal, and seventh comparison means for comparing one of said detected refrigerant pressures with said third predetermined pressure and providing a seventh control signal when said one of said detected refrigerant pressures is greater than said third predetermined pressure, wherein said electromagnetic clutch is turned on in response to said seventh control signal.

2. The device of claim 1 wherein in response to the comparison by said first comparison means and the absence of said first control signal said pressure detector means is controlled to detect the refrigerant pressure at the outlet side of said evaporator.

3. The device of claim 1 wherein in response to the comparison by said second comparison means and the absence of said second control signal said pressure detector means is controlled to detect the refrigerant pressure at the outlet of said evaporator.

4. The device of claim 1 wherein in response to the comparison by said fourth comparison means and the absence of said fourth control signal said fourth comparison means is controlled to compare one of said detected refrigerant pressures with said second predetermined pressure.

5. The device of claim 1 wherein in response to the comparison by said sixth comparison means and the presence of said sixth control signal said sixth comparison means is controlled to compare said one of said refrigerant pressures with said first predetermined pressure.

6. The device of claim 1 wherein in response to the comparison by said seventh comparison means and the absence of said seventh control signal said seventh comparison means is controlled to compare said one of said detected refrigerant pressures with said third predetermined pressure.

7. The device of claim 1 wherein said pressure detector means detects said refrigerant pressure four through eight times for fifteen through thirty seconds and calculates the average of said refrigerant pressures based on the detected pressure values to determine said first refrigerant pressure.

8. The device of claim 1 wherein said pressure detector means detects said refrigerant pressure four through eight times for fifteen through thirty seconds and calculates the average of said refrigerant pressures based on the detected pressure values to determine said second refrigerant pressure.

9. The device of claim 1 wherein said control means initially controls said capacity changing means to operate said compressor at a small capacity for an initial predetermined time.

10. The device of claim 1 wherein said first range of predetermined values comprise first, second, third and fourth predetermined values.

11. The device of claim 10 wherein said second range of predetermined values comprises first, second, third and fourth predetermined values.

12. The device of claim 11 wherein said first predetermined value of said first range is less than said first predetermined value of said second range.

13. The device of claim 12 wherein said second predetermined value of said second range is less than said first predetermined value of said second range.

14. The device of claim 13 wherein said second predetermined value of said first range is less than said second predetermined value of second range.

15. The device of claim 14 wherein said third predetermined value of said second range is less than said second predetermined value of said second range.

16. The device of claim 15 wherein said third predetermined value of said first range is less than said third predetermined value of said second range.

17. The device of claim 16 wherein said fourth predetermined value of said second range is less than said third predetermined value of said second range.

18. The device of claim 17 wherein said fourth predetermined value of said first range is less than said fourth predetermined value of said second range.

19. The device of claim 1 wherein said control means comprises a microprocessor.

20. The device of claim 18 wherein said first predetermined value of said second range is less than said predetermined pressure.

21. a device for controlling the capacity of a variable compressor having an evaporator, an electromagnetic clutch and compressor capacity changing means, said device comprising:
pressure sensor means operatively connected for detecting a refrigerant pressure at an outlet side of said evaporator; and
control means for controlling said electromagnetic clutch and said capacity changing means, said control means including:
predetermination means for initially setting first, second, third and fourth predetermined pressures equal to respective values of a second range of predetermined values,
first comparison means for comparing said detected refrigerant pressure with said second predetermined pressure and providing a first control signal when said detected refrigerant pressure is less than said second predetermined pressure, wherein said capacity changing mechanism changes the capacity of said compressor to a small capacity in response to said first control signal,
second comparison means for detecting whether a timer is turned on and providing a second control signal if said timer is on, wherein in response to said second control signal, time measuring means measures the duration of time for which said compressor is operated at a large capacity,
third comparison means for comparing said duration of time with a predetermined time in response to the comparison by said second comparison means and the presence of said second control signal, and providing a third control signal when said duration of time is greater than said predetermined time, wherein in response to said third control signal said first, second, third and fourth predetermined pressures are set equal to respective values of a first range of predetermined values and in the absence of said third control signal said first, second, third and fourth predetermined pressures are maintained equal to respective values of said second range of predetermined values,
fourth comparison means for comparing said detected refrigerant pressure with said first predetermined pressure and providing a fourth control signal when said detected refrigerant pressure is greater than said first predetermined pressure, wherein said capacity changing mechanism changes the capacity of said compressor to a large capacity in response to said fourth control signal,
fifth comparison means for comparing said detected refrigerant pressure with a fourth predetermined pressure in response to the comparison by said fourth comparison means and the absence of said fourth control signal, said fifth comparison means providing a fifth control signal when said detected refrigerant pressure is greater than said fourth predetermined pressure, wherein said electromagnetic clutch is turned off in response to the absence of said fifth control signal, and
sixth comparison means for comparing said detected refrigerant pressure with said third predetermined pressure and providing a sixth control signal when said detected refrigerant pressure is greater than said third predetermined pressure, wherein said electromagnetic clutch is turned on in response to said sixth control signal.

22. The device of claim 21 wherein in response to the comparison by said first comparison means and the absence of said first control signal said first comparison means is controlled to compare said detected refrigerant pressure with said second predetermined pressure.

23. The device of claim 21 wherein in response to the comparison by said second comparison means and the absence of said second control signal said fourth comparison means is controlled to compare said detected refrigerant pressure with said first predetermined pressure.

24. The device of claim 21 wherein in response to the comparison by said fifth comparison means and the presence of said fifth control signal said fourth comparison means is controlled to compare said detected refrigerant pressure with said first predetermined pressure.

25. The device of claim 21 wherein in response to the comparison by said sixth comparison means and the absence of said sixth control signal said sixth comparison means is controlled to compare said detected refrigerant pressure with said third predetermined pressure.

26. The device of claim 21 wherein said control means initially controls said capacity changing means to operate said compressor at a small capacity for an initial predetermined time.

27. The device of claim 21 wherein said first range of predetermined values comprises first, second, third and fourth predetermined values.

28. The device of claim 27 wherein said second range of predetermined values comprises first, second, third and fourth predetermined values.

29. The device of claim 28 wherein said first predetermined value of said first range is less than said first predetermined value of said second range.

30. The device of claim 29 wherein said second predetermined value of said second range is less than said first predetermined value of said first range.

31. The device of claim 30 wherein said second predetermined value of said first range is less than said second predetermined value of said second range.

32. The device of claim 31 wherein said third predetermined value of said second range is less than said second predetermined value of said first range.

33. The device of claim 32 wherein said third predetermined value of said first range is less than said third predetermined value of said second range.

34. The device of claim 33 wherein said fourth predetermined value of said second range is less than said third predetermined value of said first range.

35. The device of claim 34 wherein said fourth predetermined value of said first range is less than said fourth predetermined value of said second range.

36. The device of claim 21 wherein said control means is a microprocessor.

37. A device for controlling the capacity of a variable compressor having an evaporator, an electromagnetic clutch and compressor capacity changing means, said device comprising:

pressure sensor means operatively connected for detecting a refrigerant pressure at an outlet side of said evaporator to determine at least first and second refrigerant pressures, first temperature sensor means disposed at the inlet side of said evaporator to detect a first temperature of air at the inlet of said evaporator, second temperature sensor means disposed at the outlet side of said evaporator to detect a second temperature of air at the outlet of said evaporator; and control means for controlling said electromagnetic clutch and said capacity changing means, said control means including:

first comparison means for comparing said first detected refrigerant pressure with said second detected refrigerant pressure and providing a first control signal when said first detected refrigerant pressure is greater than said second detected refrigerant pressure wherein a pressure change ratio is calculated based on said first and second detected refrigerant pressures in response to both the first comparison and the presence of said first control signal, second comparison means for comparing one of said detected refrigerant pressures with a predetermined pressure and providing a second control signal when said one of said detected refrigerant pressures is less than said predetermined pressure, third comparison means for comparing said pressure change ratio with a predetermined pressure change ratio in response to the comparison by said second comparison means and the presence of said second control signal, said third comparison means providing a third control signal when said pressure change ratio is less than said predetermined pressure change ratio, wherein in response to said third control signal first, second, third and fourth predetermined temperatures are set equal to respective values of a first range of predetermined values and in the absence of said third control signal said first, second, third and fourth predetermined temperatures are set equal to respective values of a second range of predetermined values, fourth comparison means for comparing said second temperature with said fourth predetermined temperature and providing a fourth control signal when said second temperature is greater than said fourth predetermined temperature, wherein said capacity changing means changes the capacity of said compressor to a small capacity in response to the absence of said fourth control signal, fifth comparison means for comparing said first temperature with said second predetermined temperature in response to the comparison by said fourth comparison means and the presence of said fourth control signal, said fifth comparison means providing a fifth control signal when said first temperature is less than said second predetermined temperature, wherein said capacity changing means changes the capacity of said compressor to a small capacity in response to said fifth control signal, sixth comparison means for comparing said first temperature with said first predetermined temperature and providing a sixth control signal when said first temperature is greater than said first predetermined temperature, wherein said capacity changing mechanism changes the capacity of said compressor to a large capacity in response to said sixth control signal.

seventh comparison means for comparing said second temperature with said fourth predetermined temperature in response to the comparison by said sixth comparison means and the absence of said sixth control signal, said seventh comparison means providing a seventh control signal when said second temperature is greater than said fourth predetermined temperature, wherein said electromagnetic clutch is turned off in response to the absence of said seventh control signal, eighth comparison means for comparing said second temperature with said third predetermined temperature and providing an eighth control signal when said second temperature is greater than said third predetermined temperature, wherein said electromagnetic clutch is turned on in response to said eighth control signal.

38. The device of claim 37 wherein in response to the comparison by said first comparison means and the absence of said first control signal said pressure sensor means is controlled to detect the refrigerant pressure at the outlet side of said evaporator to determine a first refrigerant pressure.

39. The device of claim 37 wherein in response to the comparison by said second comparison means and the absence of said second control signal said pressure sensor means is controlled to detect said refrigerant pressure at the outlet side of said evaporator to determine a second refrigerant pressure.

40. The device of claim 37 wherein in response to the comparison by said fifth comparison means and the absence of said fifth control signal said fourth comparison means is controlled to compare said second temperature with said fourth predetermined temperature.

41. The device of claim 37 wherein in response to the comparison by said seventh comparison means and the presence of said seventh control signal said sixth comparison means is controlled to compare said first temperature with said first predetermined temperature.

42. The device of claim 37 wherein in response to the comparison by said eight comparison means and the absence of said eighth control signal said eighth comparison means is controlled to compare said second temperature with said third predetermined temperature.

43. The device of claim 37 wherein said pressure sensor means detects said refrigerant pressure four through eight times for fifteen through thirty seconds and calculates the average of said refrigerant pressures to determine said first refrigerant pressure.

44. The device of claim 37 wherein said pressure sensor means detects said refrigerant pressure four through eight times for fifteen through thirty seconds and calculates the average of said refrigerant pressures to determine said second refrigerant pressure.

45. The device of claim 37 wherein said control means initially controls said capacity changing means to operate said compressor at a small capacity for an initial predetermined time.

46. The device of claim 37 wherein said first range of predetermined values comprises first, second, third and fourth predetermined values.

47. The device of claim 46 wherein said second range of predetermined values comprises first, second, third and fourth predetermined values.

48. The device of claim 47 wherein said first predetermined value of said first range is less than said first predetermined value of said second range.

49. The device of claim 48 wherein said second predetermined value of said second range is less than said first predetermined value of said first range.

50. The device of claim 49 wherein said second predetermined value of said first range is less than said second predetermined value of said second range.

51. The device of claim 50 wherein said third predetermined value of said first range is less than said second predetermined value of said first range.

52. The device of claim 51 wherein said third predetermined value of said second range is less than said third predetermined value of said first range.

53. The device of claim 52 wherein said fourth predetermined value of said first range is less than said third predetermined value of said second range.

54. The device of claim 53 wherein said fourth predetermined value of said second range is less than said fourth predetermined value of said first range.

55. The device of claim 37 wherein said control means comprises a microprocessor.

* * * * *